US008463798B1

(12) United States Patent
Claudatos et al.

(10) Patent No.: US 8,463,798 B1
(45) Date of Patent: Jun. 11, 2013

(54) PRIORITIZED RESTORE

(75) Inventors: Christopher Hercules Claudatos, San Jose, CA (US); William Dale Andruss, Minneapolis, MN (US); Steven R. Terwilliger, Foster City, CA (US)

(73) Assignee: EMC Corporation, Hopkinton, MA (US)

( * ) Notice: Subject to any disclaimer, the term of this patent is extended or adjusted under 35 U.S.C. 154(b) by 334 days.

(21) Appl. No.: 11/731,921

(22) Filed: Mar. 31, 2007

(51) Int. Cl.
G06F 17/30 (2006.01)

(52) U.S. Cl.
USPC .................................. 707/752; 707/999.007

(58) Field of Classification Search
None
See application file for complete search history.

(56) References Cited

U.S. PATENT DOCUMENTS

| | | | |
|---|---|---|---|
| 5,659,614 A * | 8/1997 | Bailey, III | 713/165 |
| 5,966,730 A | 10/1999 | Zulch | |
| 6,148,372 A | 11/2000 | Mehrotra et al. | |
| 6,226,759 B1 | 5/2001 | Miller et al. | |
| 6,496,949 B1 | 12/2002 | Kanevsky et al. | |
| 6,880,051 B2 | 4/2005 | Timpanaro-Perrotta | |
| 6,982,842 B2 | 1/2006 | Jing et al. | |
| 6,999,978 B2 | 2/2006 | Frank et al. | |
| 7,073,036 B2 | 7/2006 | Furuya et al. | |
| 7,103,740 B1 | 9/2006 | Colgrove et al. | |
| 7,231,502 B2 | 6/2007 | Lam et al. | |
| 7,266,718 B2 | 9/2007 | Idei et al. | |
| 7,318,095 B2 | 1/2008 | Husain et al. | |
| 7,412,583 B2 | 8/2008 | Burton et al. | |
| 7,418,464 B2 | 8/2008 | Cannon et al. | |
| 7,529,785 B1 | 5/2009 | Spertus et al. | |
| 7,529,830 B2 | 5/2009 | Fuji | |
| 7,620,843 B2 | 11/2009 | Zohar et al. | |
| 7,657,796 B1 | 2/2010 | Kaiser et al. | |
| 7,694,092 B2 | 4/2010 | Mizuno | |
| 2003/0120772 A1 | 6/2003 | Husain et al. | |
| 2003/0145226 A1 | 7/2003 | Bruton et al. | |
| 2003/0177324 A1 * | 9/2003 | Timpanaro-Perrotta | 711/162 |
| 2003/0212716 A1 | 11/2003 | Steele et al. | |
| 2004/0034672 A1 | 2/2004 | Inagaki | |
| 2004/0051988 A1 | 3/2004 | Jing et al. | |
| 2004/0073676 A1 | 4/2004 | Honma et al. | |
| 2005/0177767 A1 * | 8/2005 | Furuya et al. | 714/13 |
| 2005/0257085 A1 * | 11/2005 | Haustein et al. | 714/13 |
| 2006/0167838 A1 * | 7/2006 | Lacapra | 707/2 |
| 2007/0055660 A1 | 3/2007 | Anderson | |
| 2007/0130599 A1 | 6/2007 | Monroe | |
| 2007/0136286 A1 * | 6/2007 | Webster et al. | 707/7 |
| 2007/0136541 A1 | 6/2007 | Herz et al. | |
| 2007/0168715 A1 | 7/2007 | Herz et al. | |
| 2007/0180058 A1 * | 8/2007 | Wu et al. | 709/219 |
| 2007/0254697 A1 | 11/2007 | Sugio et al. | |
| 2007/0271316 A1 | 11/2007 | Hollebeek | |
| 2008/0028008 A1 * | 1/2008 | Brunet et al. | 707/204 |
| 2008/0034249 A1 | 2/2008 | Husain et al. | |
| 2008/0046483 A1 | 2/2008 | Lehr et al. | |
| 2008/0072002 A1 | 3/2008 | Kuwahara et al. | |
| 2008/0222376 A1 | 9/2008 | Burton et al. | |
| 2008/0270823 A1 | 10/2008 | Hare et al. | |
| 2008/0282253 A1 | 11/2008 | Huizenga | |

* cited by examiner

*Primary Examiner* — Anteneh Girma
(74) *Attorney, Agent, or Firm* — Theodore A. Chen; Krishnendu Gupta

(57) ABSTRACT

A method, article of manufacture, and apparatus for restoring or transmitting files from a first location to a second location, comprising prioritizing the files, and restoring or transmitting the files in prioritized order. In one embodiment, the files may be prioritized according to file type, and may be subsorted by timestamp. In one embodiment, the files may be prioritized according to timestamp or timestamp range, and subsorted by file type. File types may be grouped such that all file types in a group have the same priority, and the group may be associated with an application or application suite. In one embodiment, the files may be prioritized according to predicted file usage.

19 Claims, 3 Drawing Sheets

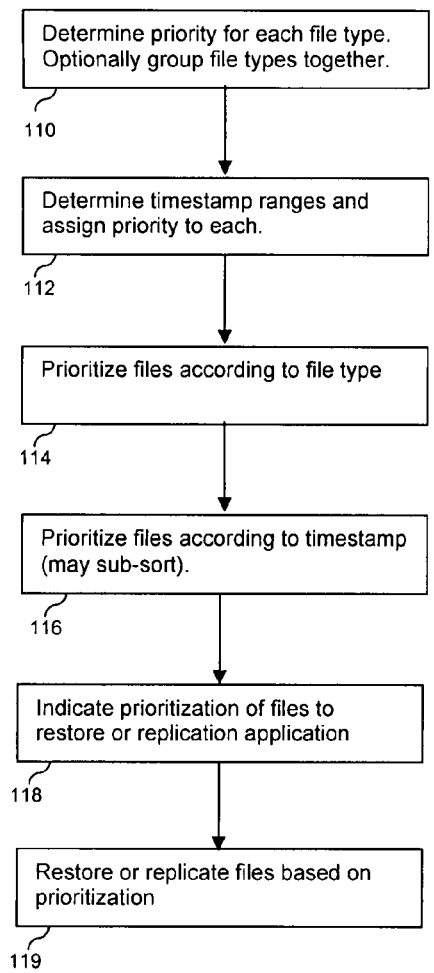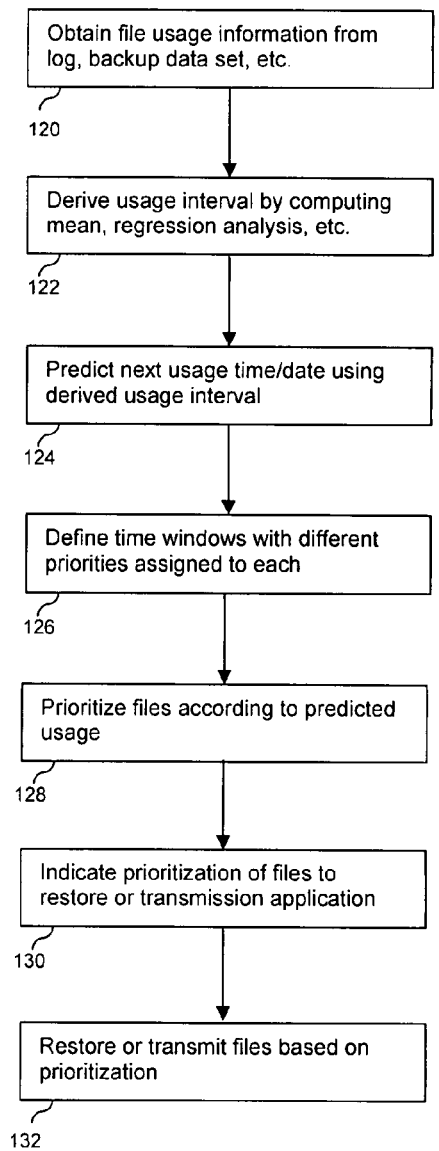
FIG. 3
FIG. 4

PRIORITIZED RESTORE

CROSS-REFERENCE TO RELATED APPLICATIONS

This application is related to co-pending U.S. patent application Ser. No. 11/731,931 for RAPID RESTORE and filed concurrently herewith, which is incorporated herein by reference for all purposes.

FIELD OF THE INVENTION

This invention relates generally to backup, and more particularly to systems and methods for performing restore operations on backed up data.

BACKGROUND OF THE INVENTION

This invention relates to systems and methods for performing restore operations on backed up data. A system's or data's importance to an organization or user is often used as a determining factor in assigning the degree to which the data or systems are protected. Some forms of protection are as simple as keeping backup copies of systems and data ("backups"), while others make use of redundant systems with rapid failover capabilities to ensure functional continuity. Generally speaking, backup systems that provide rapid or near instant functional recovery cost more than systems which provide slower recovery methods. As a result, recovery time for some users/data may take longer than the user would like. As undesirable as this may be for the user, the enterprise may not be willing to spend additional money on a faster recovery system.

Another factor affecting recovery times is the bandwidth of the connection between the target system and the backup repository. High bandwidth connections such as those made over a wired LAN may be as much as 100 megabits per second (Mbps), 1 gigabits per second (Gbps), or more. At these speeds recovery can be completed in hours or even minutes with the largest backup sets. The same is not true of lower bandwidth connections. Many remote offices and remote workers are connected to their headquarters via low-bandwidth connections, commonly 1 Mbps and 2 Mbps connections. At this low bandwidth, recovery of commonly sized hard disk drives can take more than a day and sometimes weeks.

There exists a need to inexpensively and rapidly perform restore operations on backed up data over any variety of connection speeds in order to restore functional utility to the system/user in as little time as possible. Due to cost considerations, this objective should be accomplished without increasing the speed or number of connections between the backup data and the system, or increasing the speed, performance, throughput, or number of processors and/or data storage devices.

There is a need, therefore, for an improved method, article of manufacture, and apparatus for performing restore operations on backed up data.

BRIEF DESCRIPTION OF THE DRAWINGS

The present invention will be readily understood by the following detailed description in conjunction with the accompanying drawings, wherein like reference numerals designate like structural elements, and in which:

FIG. 3 is a flowchart illustrating a process for prioritizing according to file type and/or timestamps and restoring data in some embodiments of the invention;

FIG. 4 is a flowchart illustrating a process for prioritizing according to periodicity and restoring data in some embodiments of the invention;

DETAILED DESCRIPTION

Figure 1:
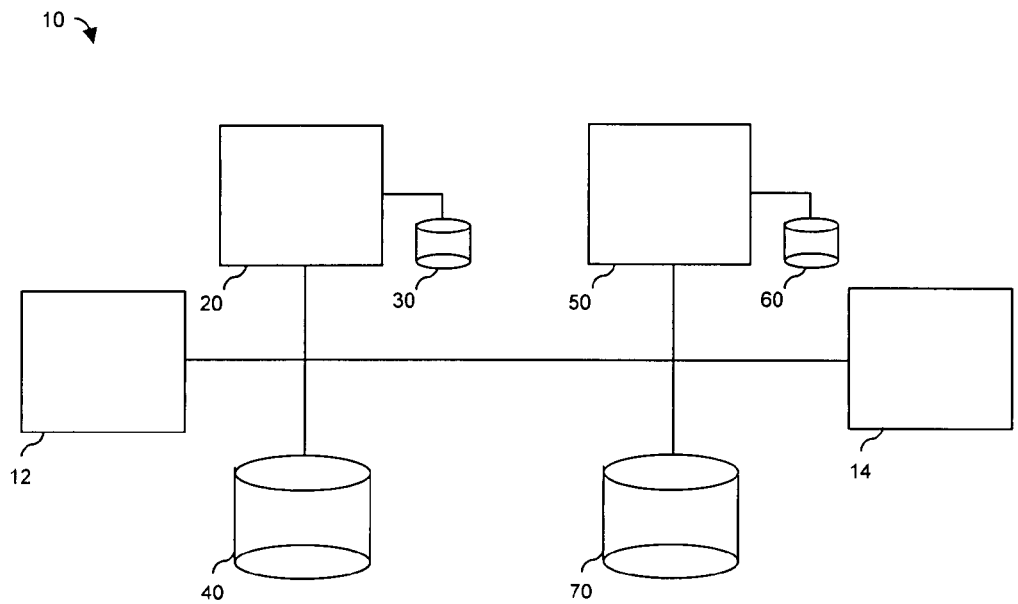
FIG. 1 is a diagram of an embodiment of a system in accordance with the invention.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

An embodiment of the invention will be described with reference to a computer system on which a restore program executes, but it should be understood that the principles of the invention are not limited to this particular configuration. Rather, they may be applied to any system in which data is transmitted across a connection to a remote device, and the system may comprise one or more devices. Although the methods herein are described in terms of their application to performing restore operations on backed up data, one skilled in the art will recognize that they are equally applicable to other cases for which it is desirable to transfer data across a connection, including but not limited to backup, replication, and archiving. For example, the principles disclosed herein may be applied to replication, to rapidly create a functionally useful replication set at another location. Disclosed herein are a method and system to restore backed up data, in a manner that provides functional utility to a remote system as quickly as possible. Thus, rapid recovery of system/data utility will be facilitated. The principles described herein will be of particular benefit to remote offices connected to a main office through low bandwidth connections, but are beneficial to local systems connected via high bandwidth connections as well, such as in hierarchical storage management systems and local replication. The terms "files" and "data" are used herein to refer to recovery objects, but it should be understood that the disclosure is not restricted to files. Rather, it applies equally to block level recovery and to any data objects used in a recovery process.

FIG. 1 illustrates a configuration in which a backup and restore system 10 comprising a restore program could be used to restore backed up (backup) data. Backup server 20 communicates with system 50 over a network (e.g., a local area network, wide area network, etc.). System 50 may have a backup client executing on it, and may have storage systems 60 and/or 70 on which its data is stored. System 50 may send its backups to storage system 40 or storage system 30 attached to backup server 20. When restore operations are performed, backup data from storage system 40 or storage system 30 may be restored to storage system 60 or storage system 70 for use by the system 50. An agent executing on system 12 may be used to scan the backup to determine prioritization of the files or data stored on storage system 30 or storage system 40. In one embodiment, the agent executing on system 14 may be used to scan the files or data on storage system 60 or 70. In some embodiments, the agent may execute on backup server 20 or system 50. The agent may be used to capture information about usage of the files or data. It will be understood that the agent may execute on any of the systems shown or on other systems, and that more than one agent may be used. Various configurations are possible, and the principles disclosed herein are not limited to the embodiment disclosed.

Typical backup systems restore data in arbitrary order, such as in the order the data appeared on the original target system, or in reverse order in which the data was backed up. Similarly, replication systems may arbitrarily transmit data in the order that they appear on the source system. However, the majority of the files/data contained in the backup set (or set to be replicated) are often not immediately needed or important to the user or system. Data recovery is performed according to the arbitrary order of the data within the backup pool, without any sense of priority in relationship to user or application importance or urgency. This is typical of both file-based and image-based backup technologies.

The backup process can be accelerated through the use of data de-duplication techniques ("RDE" redundant data elimination) and compression. During recovery of de-duplicated data, it is necessary to reconstitute the data and pass it through the low bandwidth connection. RDE techniques may be used for recovery as well, but they require the use of an RDE system on both sides of the connection, which may be impractical or out of project scope. Further, the benefit of de-duplication is diminished when data is encrypted or is of a sufficiently random data type such as music, video, and photos.

A user may want all of the backup files restored, but not all the files may be needed immediately for read/write operations. On the other hand, there may be files that are of current importance and value to the user or system and should be restored and available as soon as possible. If these files or data are restored in higher priority and before the less important files, then the user or system will have functional utility restored much sooner than if the files were restored in random order or with arbitrary priority. Functional utility may be from the viewpoint of the system, in terms of files that are needed by the system (or an application using or executing on the system), or from the viewpoint of the user, in terms of the files that are needed by the user.

Figure 2:
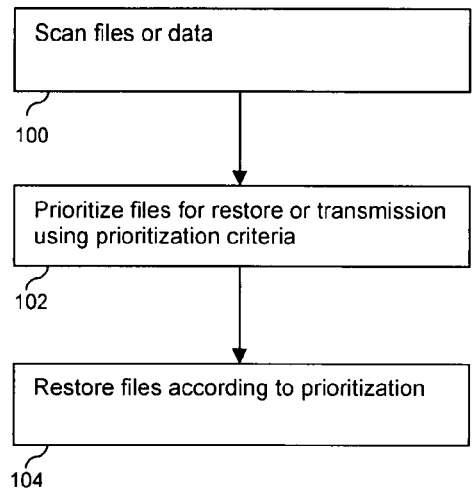
FIG. 2 is a flowchart illustrating a process for prioritizing and restoring data in some embodiments of the invention.

Because having files or data of current importance restored in higher priority results in more rapid restoration of utility, it is important to select which files/data may be of the greatest current importance. Backed-up data may be restored based on one or more algorithms that determine the order in which to restore the data. These algorithms may be used to determine which files are likely to have the most immediate relevance and utility to the user or system. The recovery order of the files may be based on this determination, resulting in recovery of files with the greatest immediate and near-term (temporal) relevance before recovery of other files with less relevance. This approach provides the user or system with very rapid access to required files or data objects even before the entire set of recovery files or objects is fully restored. FIG. 2 illustrates an embodiment of this process. The files or data are scanned, step 100. In step 102, the files are prioritized according to the prioritization criteria, as will be described herein. The files may be restored (or transmitted, if a replication or other operation is taking place) according to the prioritization, step 104.

A variety of algorithms may be used individually or in combination to determine an appropriate recovery order. In one embodiment, a Most Recently Used (MRU) algorithm may be used. For example, files may be ordered according to their last use date and time, and in this approach, the file that was used last is recovered first. The next to last used file is recovered second and the process continues accordingly until all the files are restored. A file's timestamp metadata may be used to determine the most recent use of the file. A variety of file metadata, such as creation timestamp, last access/read timestamp, last metadata change timestamp, last archive timestamp, may be used individually or in combination to best assess importance. Timestamp metadata may be kept as an intrinsic part of the data itself, or this information may also be copied and kept as part of another data structure such as a database or XML file for use by the backup/restore application. Usage of a data structure to store timestamp information of files facilitates processing without need to open each file or backup data set to analyze timestamps. The timestamp may contain several attributes, such as time and date. Prioritization may be also be done by timestamp ranges, defining a range of times and/or dates, and assigning a priority to each range. For example, several timestamp ranges may be defined, with the first range being timestamps within the last few hours, timestamps within the past day, timestamps within the past week, etc. with higher priority going to the most recent timestamp range.

In one embodiment, files may be ordered according to file type, such as document files (example: Microsoft Word documents or Adobe PDF documents), presentation files (example: Microsoft PowerPoint files), spreadsheet files (example: Microsoft Excel files), database files (example: Microsoft Access files), and so on. For example, PowerPoint files may take precedence over text files (.TXT). File types may be grouped with the same priority and given higher or lower priority than other groups or individual file types. For example, all Microsoft Office file types can have the same higher priority than text files (.DOC, .XLS, .PPT>.TXT). The prioritization and grouping may be determined by the application vendor, the system administrator, the user, etc. Groups of file types may be defined according to their association to an application, application suite, task, and so on. Priority may be assigned to a group such that each file type in the group would have the same priority. File type data may be kept as an intrinsic part of the data itself. This information may also be copied and kept as part of another data structure such as a database or XML file for use by the backup/restore application.

In one embodiment, the frequency of a file's use or its periodicity (usage cycle) may be used to determine the restoration priority of the file. Therefore, higher restoration priority may be given to files having higher frequency of use or whose periodicity coincides with the current or desired timeframe. Frequency of use may be tracked by recording each access to a file, storing this information in metadata associated with the file or in a central data structure.

Periodicity may be determined by tracking file or data usage, such as by logging. The log may be native to the system or application, or an independent logging system may be used to provide a record of file and data usage. In some embodiments, periodicity may be determined through analysis of backup data sets and archives. Within the backup and archive data sets there exists a body of data which can be mined for the purpose of predicting usage intervals using any of a variety of analytic and predictive techniques. Timestamp data can be collected from backup data sets and archives and used to create a usage record of the file and data in question. Based on the history of file/data usage, a usage interval may be derived, and utilized in predicting or estimating the next time of usage. The mean interval may be calculated, or various statistical methods can be used for data smoothing and analysis to predict the next time of usage. Such methods may include time-series modeling, regression analysis, autoregressive models, moving averages, and so on.

For example, in a simple approach, suppose File X was opened on these dates: Jan. 1, 2004, Jan. 3, 2005, Jan. 2, 2006, and Jan. 1, 2007. If the current date (the recovery or transmission date) is Dec. 28, 2007 and the system is performing a recovery operation, and the total restoration interval will take 2 weeks, the system may need to predict which files will be needed while the recovery is taking place. Given this, the timeframe or window will be at least within two weeks beginning Dec. 28, 2007. Based on the above data, File X's periodicity may be calculated at 365 days, with a deviation of +/−2 days. This implies that File X's next usage point in time will fall within two weeks for Dec. 28, 2007. In one embodiment, the month/day with highest frequency of usage could be used. In this case, the file was used twice on January 1, and once on January 2 and 3, resulting in a predicted date of usage Jan. 1, 2008. A conservative date of Dec. 30, 2007 may be assigned as this would be two days prior to the predicted usage date. In some cases, the predicted usage date may be just prior to the current date, and the file may not have been used recently. This may be taken as an indication that the file will be used soon, and it may be desirable to ensure that such files with predicted dates occurring just prior to the current date are prioritized for recovery or transmission. In one embodiment, a recovery window may be defined to include a time period prior to the current date, and the window need not be symmetric about the current date. Several ranges may be defined, with a different priority assigned to each. In one embodiment, the range including the current date could receive the highest priority, with other ranges representing future dates receiving lower priorities with increasing distance from the current date.

Using this information, a priority or score may be associated with the file and used to establish the file's restore priority. This prioritization from predicted usage may be used to determine final prioritization, or combined with other factors such as file type. Weighting the results may offer additional dimensions that could improve the functional utility recovery rate, as timestamp or predicted usage alone may not be sufficient to effectively predict which files will be needed the soonest. For example, some files may be used on an annual basis and their last date of use may be outside a specified recovery time period that has high priority associated with it. In this case, the timestamp alone would suggest that the file not be recovered with high priority. However, by determining the interval of use, it is possible to assign a high priority to the recovery of the file if the due date or anniversary of use is close to the current date. On the other hand, a file may have been used recently, which might cause its timestamp score to favor priority recovery. This file might also have a predicted usage date that is a year away, which might cause its predicted usage score to favor lower priority. Scoring may be used to reflect priority determinations that have been made. For example, a file falling within the specified time period could have a certain number of points added to its priority score, and if the file's predicted next use is close to the current date or time, more points could be added to its priority score.

Other variations may include detecting the frequency of file usage during a period near the recovery date. For example, if two files have the same timestamp attribute they are likely to be given the same restoration priority. Because both files cannot come at the same time, one file must come before the other. The frequency of use can be used to further refine the restore priority. In this example, both files have the same timestamp attribute but one file was used every day for the last two weeks whereas the other file changed once since its creation. The file with the frequent and recent file changes can receive a higher weighting than the other file. This permits priority based on multiple relevant factors.

There are several ways to capture periodicity:

1) Explicit logging of file and data usage each time the file/data is read, written, or in any way touched. This may in one embodiment be handled by a real time filter driver that logs all reads and writes. In one embodiment, an application may be executed according to a scheduled interval to log changes in non-real time. In this case the timestamp attributes of the files may be read and stored within a database or other data structure. At each interval, the results of the timestamp collection are accumulated and retained within the database resulting in a view of the frequency and intervals of change for each file. The selection of the scheduled interval determines the temporal granularity of the resulting log. For example, if an interval of one month is scheduled the resulting log will be able to show which files changed from month to month. Because the scan is run on a monthly basis, the resulting log will not be able to discern files which change at greater frequency such as daily, hourly, etc. Greater temporal granularity may be achieved through higher frequency scans up to the point of real-time change logging in which every read and write is logged as it occurs.

2) Indirect logging of file and data usage. Some applications or file systems may keep track of historical file/data activity. Through examination and analysis of these records it may be possible to determine periodicity.

3) Retrospective logging of file and data usage. Through examination and analysis of backup data sets and archives, it is possible to determine file and data usage even though such logging did not occur at the time of original usage. The backup data sets and archives provide a historical snapshot of file and data states at specific points in time.

These methods may be combined in any combination or order, and used to refine orders determined by other methods. For example, the MRU algorithm may be applied, and the most recently used files may be further ordered by their file type priority and restored in the resulting order. Time/date ranges may be used to prioritize the files, which may result in larger groups of files having the same priority, and the resulting list of files may be subsorted by file type, producing a list that is ordered by time/date range and subordered by file type. The files may conversely be ordered by file type and subordered by time/date range. Prioritization by periodicity may be implemented by using time/date ranges of predicted next use, and the results subsorted by file type or timestamp. Other combinations of the disclosed methods may be used, in various orders, and weighting may be used to determine the importance of each characteristic to the restoration priority.

Thus, data may be restored in directed and intentional manner, determined according to the immediacy of value to the user and/or system. The determination of restoration priority may be performed by a restore application, by a backup application, by an application that makes use of the data, or by an application that prioritizes the data and passes it (directly or indirectly) to another application, such as the restore application, to perform the restore. The restoration/transmission of files or data in order of priority may be made in sequential fashion, or some parallelism may be used (i.e., more than one file may be sent at a time).

FIG. 3 illustrates a process flow in an embodiment. In step 110, priorities are determined for file types. File types may be grouped together, such that all file types in the same group have the same priority. Groups may be defined according to their association with an application, application suite, task, etc. In step 112, timestamp ranges may be defined and priorities assigned to each timestamp range. In step 114, files may be prioritized according to file type. Files may be prioritized according to timestamps, step 116, and this may be done by sub-sorting the prioritized files from step 114. The prioritization of files may be indicated to the restore application (or replication or other transmission application), step 118. This may, for example, be done by providing a list of files with priorities indicated, providing an ordered list, or altering a native backup set, as described herein. Files may be restored (or replicated or transmitted) according to the prioritization, step 119.

FIG. 4 illustrates a process flow in an embodiment. In step 120, file or data usage information may be obtained from a log, backup data set, or other source of file usage information. The data usage information is analyzed to determine the usage interval, step 122, and various methods may be used such as computing the mean, performing a regression analysis, etc. The predicted usage date is derived, step 124, and using defined time windows with different priorities assigned to each, step 126, the files are prioritized according to predicted usage in step 128. The prioritization of files is indicated to the transmission (or restore or replication) application, step 130, and the transmission is performed in step 132.

Disclosed herein are several methods for a restore operation to proceed according to a prioritized sequence, by which file prioritization can be indicated to the restore operation. In an embodiment, a list of backup files may be created that prioritizes the files for restore. This list may contain the file names, paths, and other data elements associated with the file, its location, and its restore-priority so that a restore program may use the information to select and restore the files according to the files' priority settings. The list may be kept in priority order. In one embodiment, priority ordering of the list is not required, and the ordering of file restores may be performed dynamically based on the priority information contained within the list. The list can be in any commonly known type or format or in a proprietary format known only to a proprietary application. For example, the list may be a text file, an XML file, or a database file.

Figure 5:
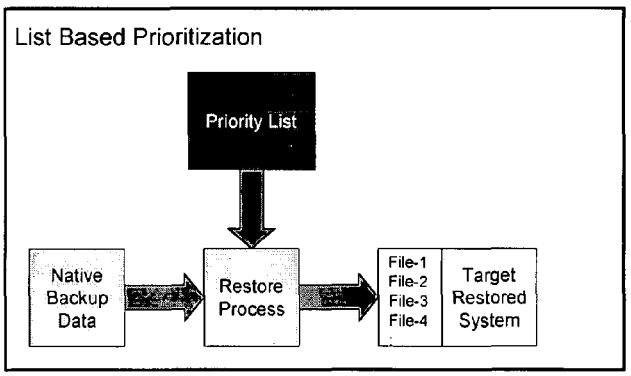
FIG. 5 is a flowchart illustrating a process for executing a list-based prioritized restore in some embodiments of the invention.

The list may be passed to the restore application in a programmatic fashion such as through XML. Alternatively, the list could be created in a form that is identical to and compatible with the native data format of the application. For example, if a restore application is not "priority restore capable" but simply restores files in an arbitrary or non-prioritized manner, it will not be able to accept direction to perform prioritized restores. In this case, the information within the priority list may be constituted in a form that is compatible with the application's native function. If the restore application uses a comma delimited file to contain its list of pending files to be restored, then the prioritized list of files may be presented in a comma delimited format usable by the restore application. In this manner, the restore application may perform priority restores without internal modification to the application. This process is illustrated in FIG. 5.

In one embodiment, native backup sets may be reordered to restore files in order of priority. Existing backup and restore applications keep their backup data within a data structure (e.g., a file system or a database). Depending on the application, the restore operation may sequence the data according to the order in which the data are ordered within the data structure itself. Alternatively, the application may make use of some form of indexing or list structure to sequence the restore operation of the backup data. In some embodiments, the restore sequence may be imposed on the restore operation to cause the restore operation to proceed according to a priority order. Some methods for accomplishing this will be described herein.

If the application sequences the restore operation according to the native order of the data structure, then the native order may be re-rendered so that the order matches that of the priority order. The data structure may be reordered at the time the restore operation is initiated, at the time of backup, or prior to the initiation of the restore operation but after the backup operation.

If the application sequences the restore operation according to an order defined within an index, list, database, etc., then the order of that data structure may be changed to conform to the desired priority order. The order of the backup data itself is not required to change in any way. Reordering may be accomplished with a variety of well-known methods. The sorting algorithm may be selected based on the desired outcome. In some cases it is desirable to have an initial sort performed on the data set and then a subsort on subsets of the data. In the case where multiple criteria are used in combination to establish the priority, multiple methods of sorting, filtering, and grouping may be used. In these cases, after an initial sort, the data may be additionally sorted and ordered to comply with the prioritization criteria.

In one embodiment, it may be desirable to have all files within a specified time period to be retrieved in order of timestamp attribute. It may also be preferred to have Microsoft Excel user files prioritized higher than any other file types. In this case, the restoration priority would be ordered such that the most recently used Excel files come before any of the other files. Stable or unstable sorting algorithms may be used depending on the sort criteria and the desired outcome. For example, if simple temporal ordering is required, the files may be sorted by either a stable or unstable sort algorithm because the only criterion is timestamp. In the case of a stable sort algorithm (such as bubble sort), the original order of records with equal values will be kept even though the order of dissimilar records will change. Conversely, unstable sort algorithms (such as quick sort) may introduce sort orders that differ from the original order for records of equal value. If timestamp alone were the only sort criteria then an unstable sort algorithm would be acceptable.

Figure 6:
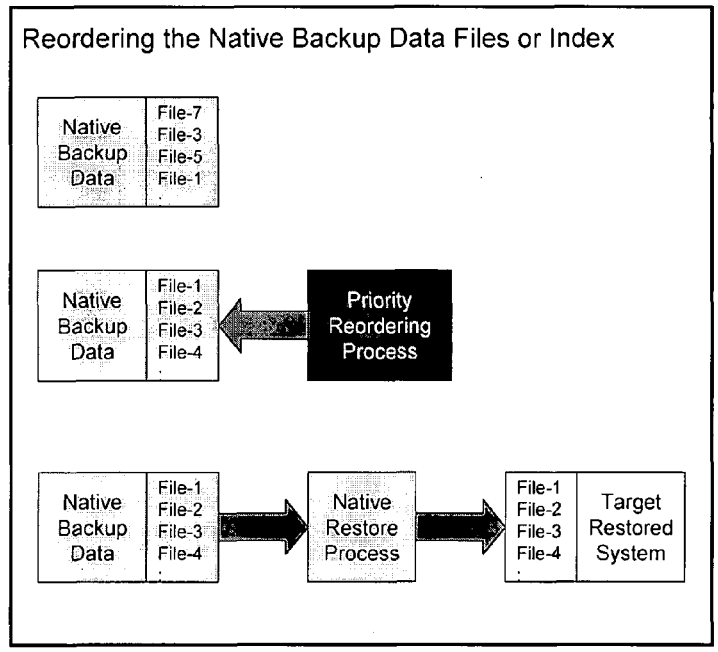
FIG. 6 is a flowchart illustrating a process for executing a prioritized restore through reordering in some embodiments of the invention.

However, in the case where multiple sort elements are considered the use of stable sort algorithms may beneficial. The data structure may be reordered at the time the restore operation is initiated, at the time of backup, or prior to the initiation of the restore operation but after the backup operation. FIG. 6 illustrates this process.

Figure 7:
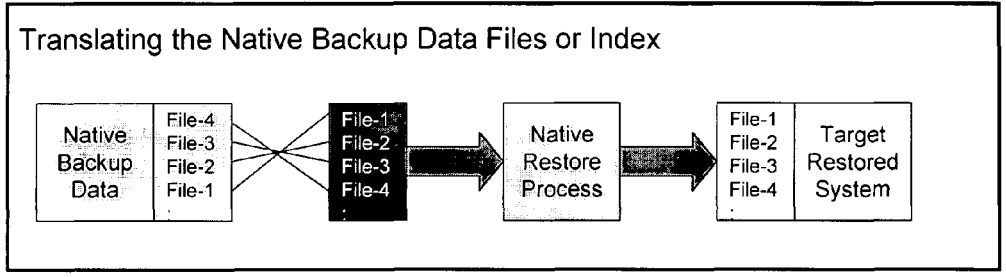
FIG. 7 is a flowchart illustrating a process for executing a prioritized restore through translation in some embodiments of the invention.

Some systems restore backup data that resides within a filesystem structure. In order to prioritize this restore sequence, the filesystem may be reordered to match the desired priority order. In an embodiment, a pseudo-filesystem structure may be created that is in priority order. The restore application may mount this pseudo-filesystem structure as it would normally mount the backup data filesystem structure. In this case, the pseudo-filesystem is ordered according to the priority sequence and the backup data remains in its original, native order, thus effectively providing a translation. The pseudo-filesystem may contain stubs that are associated to the underlying files/data. The restore system may thus restore the files in priority sequence. FIG. 7 illustrates this approach.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for restoring files having file types from a first location to a second location, comprising:
    determining a priority for each file of a set of files;
    determining a set of timestamp ranges, wherein each timestamp range of the set of timestamp ranges is assigned a priority;
    prioritizing the set of files by sorting according to file type and by subsorting a first and second subsets of the set of files according to a criteria if file type is given more weight than the criteria, wherein the criteria includes the set of timestamp ranges, wherein the first subset includes a first file type and the second subset includes a second file type, wherein each file of the first subset is associated with a first priority and each file of the second subset is associated with a second priority, wherein prioritizing the set of files based on the set of timestamp ranges includes analyzing usage of the set of files by a user to determine a usage interval for each file of the set of files, determining a predicted usage timeframe of each file of the set of files, and prioritizing the set of files according to the predicted usage timeframe of each file;
    prioritizing the set of files by sorting according to the criteria and by subsorting the first and second subsets of the set of files according to file type if the criteria is given more weight than file type, wherein the first subset satisfies a first criteria and the second subset satisfies a second criteria; and
    indicating the prioritized files to a restore application.

2. The method as recited in claim 1, wherein the files comprise backup files.

3. The method as recited in claim 2, further comprising determining a prioritization of file types, wherein a first file type has a higher priority than a second file type.

4. The method as recited in claim 3, wherein a third file type has a same priority as the first file type.

5. The method as recited in claim 2, further comprising grouping file types into a group, wherein each file type in the group has the same priority.

6. The method as recited in claim 5, wherein the group is associated with an application or application suite.

7. The method as recited in claim 6, wherein the application suite includes Microsoft Office.

8. The method as recited in claim 3, wherein prioritizing the files according to file type comprises associating files having the first file type with a higher priority than files having the second file type.

9. The method as recited in claim 3, further comprising using the restore application to restore at least a portion of the files according to the indication of prioritized files.

10. The method as recited in claim 9, wherein the indication of the prioritized files includes an ordered list.

11. The method as recited in claim 9, wherein the indication of the prioritized files includes a list associating each file with an indication of priority.

12. The method as recited in claim 1, wherein the files have timestamps associated therewith, and further comprising prioritizing the files according to the timestamps.

13. The method as recited in claim 12, wherein prioritizing the files according to the timestamps includes comparing a timestamp to a criterion selected from a group comprising time, date, range of times, and range of dates, and assigning a priority.

14. The method as recited in claim 13, wherein prioritizing the files according to the timestamps is performed before prioritizing the files according to the file types.

15. The method as recited in claim 13, wherein prioritizing the files according to the file types is performed before prioritizing the files according to the timestamps.

16. The method as recited in claim 15, wherein prioritizing the files according to the timestamps includes subsorting according to timestamps.

17. The method as recited in claim 12, further comprising obtaining the associated timestamps from a read/write log or backup or archive data set.

18. A system for transmitting files having file types and timestamps associated therewith, from a first location to a second location, comprising a processor configured to determine a priority for each file of a set of files; determine a set of timestamp ranges, wherein each timestamp range of the set of timestamp ranges is assigned a priority; prioritize the set of files by sorting according to file type and by subsorting a first and second subsets of the set of files according to a criteria if file type is given more weight than the criteria, wherein the criteria includes the set of timestamp ranges, wherein the first subset includes a first file type and the second subset includes a second file type, wherein each file of the first subset is associated with a first priority and each file of the second subset is associated with a second priority, wherein prioritizing the set of files based on the set of timestamp ranges includes analyzing usage of the set of files by a user to determine a usage interval for each file of the set of files, determining a predicted usage timeframe of each file of the set of files, and prioritizing the set of files according to the predicted usage timeframe of each file, prioritize the set of files by sorting according to the criteria and by subsorting the first and second subsets of the set of files according to file type if the criteria is given more weight than file type, wherein the first subset satisfies a first criteria and the second subset satisfies a second criteria, and transmit the files according to the prioritization of the files.

19. A non-transitory computer program product for restoring files having file types from a first location to a second location, comprising a computer readable storage medium having machine readable code embodied therein for:

determining a priority for each file of a set of files;

determining a set of timestamp ranges, wherein each timestamp range of the set of timestamp ranges is assigned a priority;

prioritizing the set of files by sorting according to file type and by subsorting a first and second subsets of the set of files according to a criteria if file type is given more weight than the criteria, wherein the criteria includes the set of timestamp ranges, wherein the first subset includes a first file type and the second subset includes a second file type, wherein each file of the first subset is associated with a first priority and each file of the second subset is associated with a second priority, wherein prioritizing the set of files based on the set of timestamp ranges includes analyzing usage of the set of files by a user to determine a usage interval for each file of the set of files, determining a predicted usage timeframe of each file of the set of files, and prioritizing the set of files according to the predicted usage timeframe of each file;

prioritizing the set of files by sorting according to the criteria and by subsorting the first and second subsets of the set of files according to file type if the criteria is given more weight than file type, wherein the first subset satisfies a first criteria and the second subset satisfies a second criteria; and indicating the prioritized files to a restore application.

* * * * *